(12) United States Patent
Ding (10) Patent No.: US 12,548,779 B2
(45) Date of Patent: Feb. 10, 2026

(54) ELECTROCHEMICAL APPARATUS AND ELECTRIC DEVICE

(71) Applicant: Ningde Amperex Technology Limited, Ningde (CN)

(72) Inventor: Tianjie Ding, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 728 days.

(21) Appl. No.: 17/706,983

(22) Filed: Mar. 29, 2022

(65) Prior Publication Data

US 2022/0320523 A1 Oct. 6, 2022

(30) Foreign Application Priority Data

Mar. 30, 2021 (CN) .......................... 202110343857.3

(51) Int. Cl.
*H01M 4/70* (2006.01)
*H01M 4/66* (2006.01)
(Continued)

(52) U.S. Cl.
CPC ........... *H01M 4/70* (2013.01); *H01M 50/461* (2021.01); *H01M 50/474* (2021.01);
(Continued)

(58) Field of Classification Search
CPC .. H01M 50/474; H01M 50/48; H01M 50/105; H01M 10/0431; H01M 10/0587;
(Continued)

(56) References Cited

U.S. PATENT DOCUMENTS 6,506,514 B1 * 1/2003 Endo ................. H01M 10/0525
429/130
6,589,690 B1 7/2003 Sato et al.
(Continued)

FOREIGN PATENT DOCUMENTS

CN 1273439 A 11/2000
CN 1214479 C 8/2005
(Continued)

OTHER PUBLICATIONS

First Office Action dated Feb. 11, 2022, issued in counterpart CN Patent Application No. 202110343857.3, w/ English translation (18 pages).
(Continued)

*Primary Examiner* — Jessie Walls-Murray
(74) *Attorney, Agent, or Firm* — WHDA, LLP (57) ABSTRACT

An electrochemical apparatus includes an electrode assembly, a packaging bag and a first connecting layer. The electrode assembly includes an adhesive layer. An outermost current collector of the electrode assembly includes a first bending portion, a second bending portion opposite to the first bending portion and a flat portion connected between the first bending portion and the second bending portion. The adhesive layer is pasted to a surface of the flat portion facing toward a winding center of the electrode assembly. The packaging, bag is configured to accommodate at least a part of the electrode assembly. The first connecting layer is pasted to the first bending portion and to a part of an outer surface of the flat portion. A projection of the second connecting, layer and a projection of the adhesive layer in a direction perpendicular to an outer surface of the flat portion have an overlapping zone.

18 Claims, 5 Drawing Sheets

(51) Int. Cl.
*H01M 50/46* (2021.01)
*H01M 50/474* (2021.01)
*H01M 50/48* (2021.01)
*H01M 6/10* (2006.01)

(52) U.S. Cl.
CPC ............ *H01M 50/48* (2021.01); *H01M 4/661* (2013.01); *H01M 2006/106* (2013.01)

(58) Field of Classification Search
CPC ......... H01M 2006/106; H01M 50/107; H01M 50/538; H01M 10/0413; H01M 50/178; H01M 50/14; H01M 50/46; H01M 50/198; H01M 50/1243; H01M 50/183; H01M 50/186

See application file for complete search history.

(56) References Cited

U.S. PATENT DOCUMENTS

| | | | |
|---|---|---|---|
| 10,833,297 B2 | 11/2020 | Ahn et al. | |
| 2005/0123824 A1* | 6/2005 | Ishikawa ........... | H01M 10/0587 429/185 |
| 2007/0072062 A1 | 3/2007 | Fukui et al. | |
| 2010/0035132 A1* | 2/2010 | Park ................... | H01M 50/627 429/94 |
| 2012/0258343 A1 | 10/2012 | Takahata et al. | |
| 2015/0171383 A1 | 6/2015 | Ahn et al. | |
| 2017/0244129 A1* | 8/2017 | Seong ................ | H01M 50/124 |
| 2018/0083311 A1* | 3/2018 | Kim ................... | H01M 50/1243 |
| 2019/0207173 A1* | 7/2019 | Li ....................... | H01M 50/103 |
| 2019/0267602 A1 | 8/2019 | Lee et al. | |
| 2019/0393540 A1 | 12/2019 | Guo | |
| 2020/0044274 A1 | 2/2020 | He et al. | |
| 2020/0067063 A1 | 2/2020 | Chen et al. | |
| 2023/0059279 A1* | 2/2023 | Horiuchi .......... | H01M 10/0587 |

FOREIGN PATENT DOCUMENTS

| | | |
|---|---|---|
| CN | 206451767 U | 8/2017 |
| CN | 208298952 U | 12/2018 |
| CN | 208690417 U | 4/2019 |
| CN | 109962284 A | 7/2019 |
| CN | 110071320 A | 7/2019 |
| CN | 110190319 A | 8/2019 |
| CN | 110233299 A | 9/2019 |
| CN | 209389153 U | 9/2019 |
| CN | 110379942 A | 10/2019 |
| CN | 110808377 A | 2/2020 |
| CN | 211789341 U | 10/2020 |
| EP | 1043782 A2 | 10/2000 |
| JP | 2000-348776 A | 12/2000 |
| JP | 2011-174009 A | 9/2011 |
| JP | 2015-118921 A | 6/2015 |
| KR | 20000076975 A | 12/2000 |
| KR | 10-2019-0102784 A | 9/2019 |
| WO | 2021/195850 A1 | 10/2021 |

OTHER PUBLICATIONS

Extended European Search Report dated Aug. 25, 2022, issued in counterpart tEP Application No. 22164847.0. (8 pages).
Office Action dated Jul. 5, 2022, issued in counterpart CN Application No. 202110343857.3. (5 pages).
Office Action dated Nov. 15, 2022, issued in counterpart CN Application No. 202110343857.3. (4 pages).
Office Action dated Apr. 4, 2023, issued in counterpart JP Application No. 2022-022066. (6 pages).

* cited by examiner

FIG. 8

ELECTROCHEMICAL APPARATUS AND ELECTRIC DEVICE

CROSS-REFERENCE TO RELATED APPLICATIONS

The present application claims the benefit of priority from the Chinese Patent Application No. 202110343857.3, filed on Mar. 30, 2021, the content of which is incorporated herein by reference in its entirety.

TECHNICAL FIELD

This application relates to the field of electrochemistry and specifically, to an electrochemical apparatus and an electric device.

BACKGROUND

With the advancement of technology and the improvement of living standards, electrochemical apparatuses and electric devices have been widely applied. As capacities of electrochemical apparatuses such as batteries increase, risks of electrolyte spill, damage and fire are also greatly increased dining dropping of electrochemical apparatuses. Particularly, electrochemical apparatuses often use a packaging bag to accommodate an electrode assembly. In a case of drop or collision, the packaging bag and the electrode assembly are likely to move relative to each other, causing damage to the electrode assembly. Current electrochemical apparatuses cannot effectively guard against the safety hazards caused by battery drops.

SUMMARY

In order to resolve the foregoing shortcomings of the prior art, this application provides an electrochemical apparatus and an electric device that have a relatively high safety performance in withstanding drops.

An embodiment of this application provides an electrochemical apparatus, including an electrode assembly with a winding structure, a packaging bag and a first connecting layer. The electrode assembly includes an adhesive layer. An outermost current collector of the electrode assembly includes a first bending portion and a second bending portion that are opposite to each other and a flat portion connected between the first bending portion and the second bending portion. The adhesive layer is pasted to a part of an inner surface of the flat portion facing toward a winding center of the electrode assembly. The packaging bag is configured to accommodate at least a part of the electrode assembly. The first connecting layer includes a first surface that is opposite to an inner surface of the packaging bag and a second surface that is opposite to the first surface. The second surface of the first connecting layer is pasted to a part of an outer surface of the first bending portion and to a part of an outer surface of the flat portion. A projection of the first connecting layer and a projection of the adhesive layer have an overlapping zone in a direction perpendicular to the outer surface of the flat portion.

According to some embodiments of this application, the first connecting layer includes a first gluing layer and a second gluing layer, where the first gluing layer is pasted to the outer surface of the flat portion, the second gluing layer is pasted to the outer surface of the first bending portion, and a thickness of the first gluing layer is less than a thickness of the second gluing layer.

According to some embodiments of this application, the first connecting layer includes a first gluing layer and a second gluing layer, where the first gluing layer is in contact with the first bending portion and the flat portion, at least a part of the second gluing layer is provided on the first gluing layer, and a projection of the second gluing layer and a projection of the adhesive layer do not overlap in a direction perpendicular to the outer surface of the flat portion.

According to some embodiments of this application, the first connecting layer is pasted to a side of the first bending portion that is close to the flat portion, and a tile length of the first connecting layer is less than half a tile length of the first bending portion.

According to some embodiments of this application, the electrochemical apparatus further includes a second connecting layer that is spaced apart from the first connecting layer, where the second connecting layer is pasted to a part of an outer surface of the second bending portion and to a part of the outer surface of the flat portion that is adjacent to the second bending portion, and a projection of the second connecting layer and a projection of the adhesive layer have an overlapping zone in a direction perpendicular to the outer surface of the flat portion.

According to some embodiments of this application, the second connecting layer is pasted to a side of the first bending portion that is close to the flat portion, and a tile length of the first connecting layer is less than half a tile length of the first bending portion.

According to some embodiments of this application, the electrochemical apparatus further includes a third connecting layer and a fourth connecting layer that are spaced apart from each other, where the third connecting layer is spaced apart from the first connecting layer, the fourth connecting layer is spaced apart from the second connecting layer, the third connecting layer is pasted to a part of the outer surface of the first bending portion, and the fourth connecting layer is pasted to a part of the outer surface of the second bending portion.

According to some embodiments of this application, the outermost current collector further includes a step portion that is opposite to the flat portion, where the step portion includes a first end connected to the first bending portion and a second end connected to the second bending portion, and the second end extends in a winding manner to the first end, where the third connecting layer is further pasted to a part of an outer surface of the first end, and/or the fourth connecting layer is further pasted to a part of an outer surface of the second end.

According to some embodiments of this application, a length of the overlapping zone in a first direction is from 0.5 mm to 20 mm, where the first direction is in a direction parallel to the outer surface of the flat portion.

According to some embodiments of this application, the electrode assembly includes a first current collector, a second current collector, and a separator located between the first current collector and the second current collector, where the first current collector, the separator, and the second current collector are wound together, a part of the first current collector forms the outermost current collector, and the adhesive layer is pasted between a surface of the outermost current collector of the electrode assembly facing toward the winding center of the electrode assembly and a part of the separator that is immediately adjacent to the outermost current collector.

According to some embodiments of this application, a material of the first current collector includes aluminum, and a material of the second current collector includes copper.

According to some embodiments of this application, the electrode assembly further includes a first active material and a second active material, where the first active material is applied on a part of a surface of the first current collector except the outermost current collector, and the second active material is applied on a part of a, surface of the second current collector.

Another embodiment of this application further provides an electric device, the electric device includes the foregoing electrochemical apparatuses.

The electrochemical apparatus in the embodiment of this application includes a paste glue and a first connecting layer. The paste glue and the first connecting layer strengthen the connection between the electrode assembly and the packaging bag. When the electrochemical apparatus drops or has a collision, the electrode assembly and the packaging bag are less likely to move relative to each other, effectively avoiding contraction of the separator, and preventing the outermost current collector of the electrode assembly from being torn out. In addition, the first connecting layer and the second connecting layer are correspondingly pasted to mainly the outer surface the first bending portion and the outer surface of the second bending portion. Such provision does not increase thickness of a major part of the electrode assembly or increase volume of the electrode assembly, so that the electrochemical apparatus of the embodiments of this application can have relatively good energy density. Further, in some embodiments, because the first connecting layer and the second connecting layer are respectively provided between the packaging bag and the first bending portion of the outermost current collector and between the packaging bag and the second bending portion of the outermost current collector, overall flatness of the electrode assembly can be improved. Therefore, the electrochemical apparatus of the embodiments of this application has high safety performance in withstanding drops, energy density and good overall flatness.

DETAILED DESCRIPTION

To make the objectives, technical solutions, and advantages of this application more comprehensible, the following describes this application in detail with reference to embodiments and accompanying drawings. It should be understood that the specific embodiments described herein are merely used to explain this application but are not intended to limit this application.

In the descriptions of this application, it should be noted that, unless otherwise specified or defined explicitly, the terms "mount", "interconnect" and "connect" are to be interpreted broadly. For example, they may refer to a fixed connection, a detachable connection, or an integral connection; may refer to a mechanical connection or an electrical connection or mutual communication; may refer to a direct connection or an indirect connection through an intermediate medium; and may refer to internal communication between two elements or interaction between two elements. A person of ordinary skill in the art can understand specific meanings of these terms in this application as appropriate to specific situations. The disclosure of this application provides many different embodiments or examples to implement different structures of this application. To simplify the disclosure of this application, the following only describes configurations and components of specific examples. Certainly, they are merely examples and are not intended to limit this application. In addition, this application may repeatedly use reference numerals and/or reference letters in different examples. Such repetition is intended to simply and clearly describe this application, and is not to indicate specific relationships between different embodiments and/or different configurations that are discussed herein.

Figure 1:
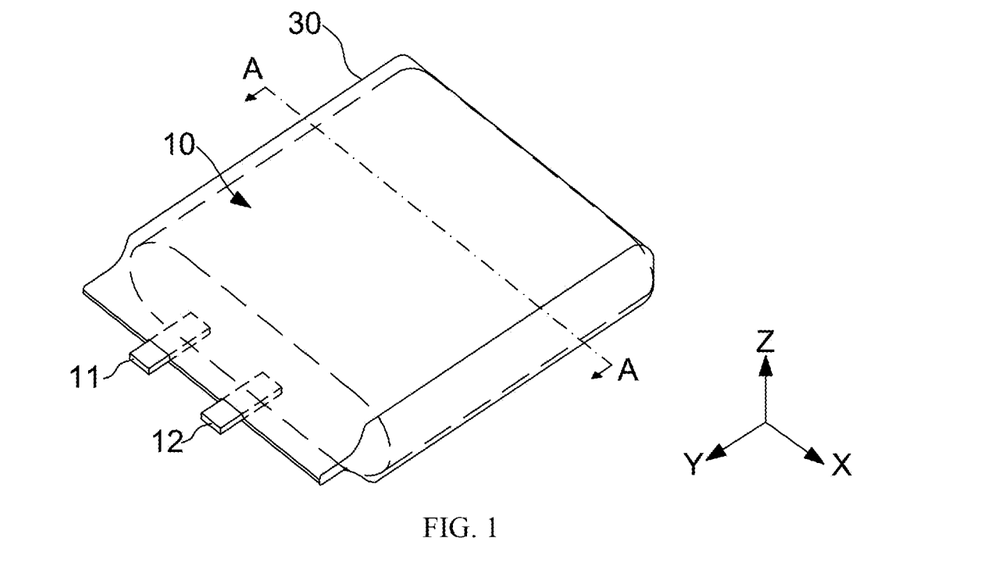
FIG. 1 is a three-dimensional diagram of an embodiment of an electrochemical apparatus of this application, where the electrochemical apparatus includes an electrode assembly and a packaging bag.

FIG. 1 is a three-dimensional diagram of an embodiment of an electrochemical apparatus 1 of this application. The electrochemical apparatus 1 includes an electrode assembly 10 and a packaging bag 30. The packaging bag 30 is configured to accommodate at least a part of the electrode assembly 10. As shown in FIG. 1, the electrochemical apparatus 1 is defined to have a length direction along X, a height direction along and a thickness direction along Z, where the X direction, Y direction and the Z direction are perpendicular to one another.

Figure 2:
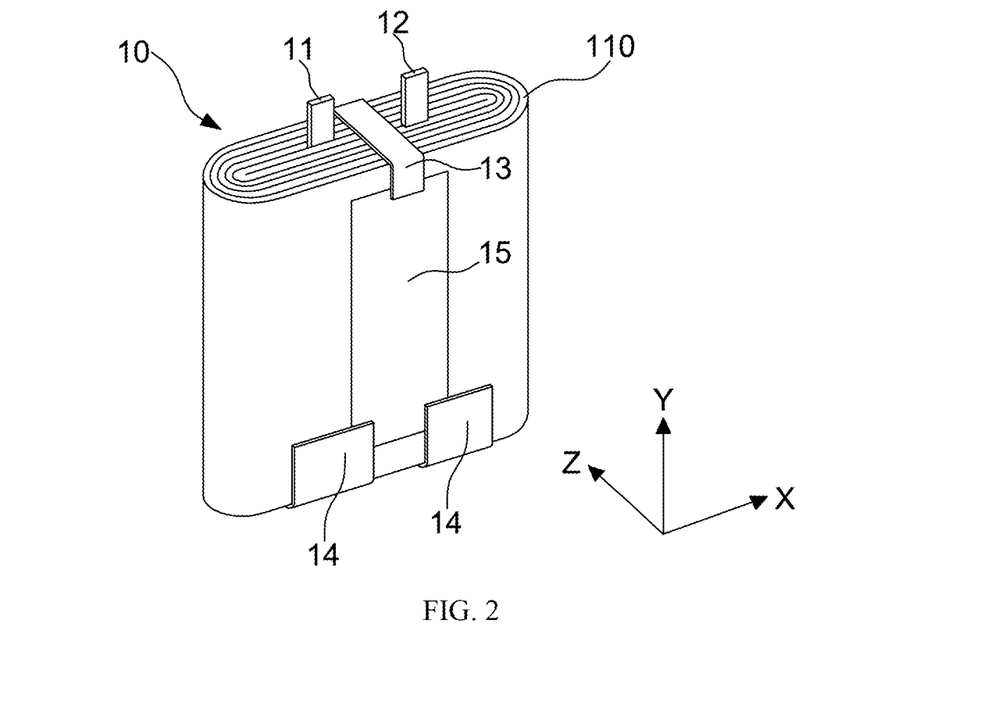
FIG. 2 is a three-dimensional diagram of the electrode assembly in FIG. 1.
Figure 3:
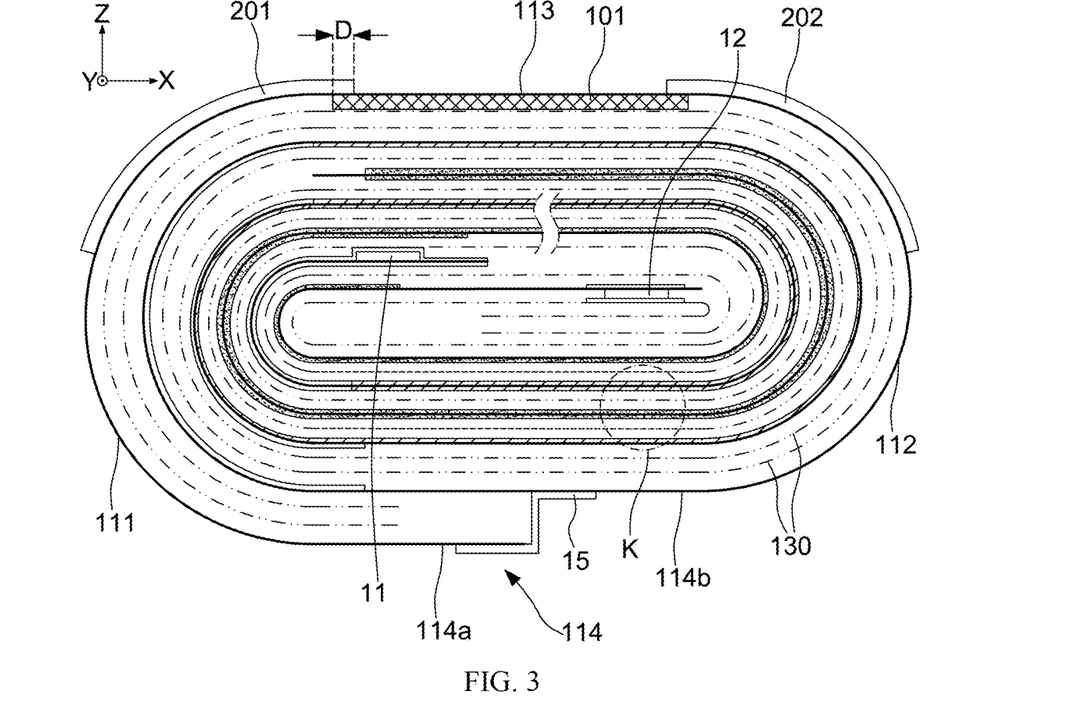
FIG. 3 is a partial sectional diagram of FIG. 1 in a direction A-A with the packaging bag omitted.

FIG. 2 is a three-dimensional diagram of an embodiment of the electrode assembly 10. The electrode assembly 10 has a winding structure. An outermost current collector of the electrode assembly 10 is labeled as 110. FIG. 3 is a sectional diagram of the electrochemical apparatus 1 of FIG. 1 in a direction A-A, where the packaging bag 30 is omitted in FIG. 3. The electrode assembly 10 further includes an adhesive layer 101 that is located adjacent to the outermost current collector 110.

The outermost current collector 110 includes a first bending portion 111 and a second bending portion 112 that are opposite to each other, and a flat portion 113 connected between the first bending portion 111 and the second bending portion 112. The adhesive layer 101 is pasted to a part of a surface of the flat portion 113 facing toward a winding center of the electrode assembly 10.

In some embodiments of this application, the electrochemical apparatus 1 may further include a first connecting layer 201. The first connecting layer 201 is configured to be pasted to the packaging bag 30 and the outermost current collector 110. The first connecting layer 201 includes a first surface that is opposite to an interior surface of the packaging bag 30 and a second surface that is opposite to the first surface, where the second surface of the first connecting layer 201 is pasted to a part of an outer surface of the first bending portion 111 and to a part of an outer surface of the flat portion 113. A projection of the first connecting layer 201 and a projection of the adhesive layer 101 in a direction perpendicular to the outer surface of the flat portion 113 have an overlapping zone D, as shown in FIG. 3. Iii some embodiments, a length of the overlapping zone D in the X direction may be any value between 0 mm and 20 mm. Further, the length of the overlapping zone D the X direction may be any value from 0.5 mm and 20 mm. In some embodiments, the X direction may be in a direction parallel to a direction in which the first bending portion 111 and the second bending portion 112 face each other, and may be in a direction parallel to the outer surface of the flat portion 113.

Figure 4:
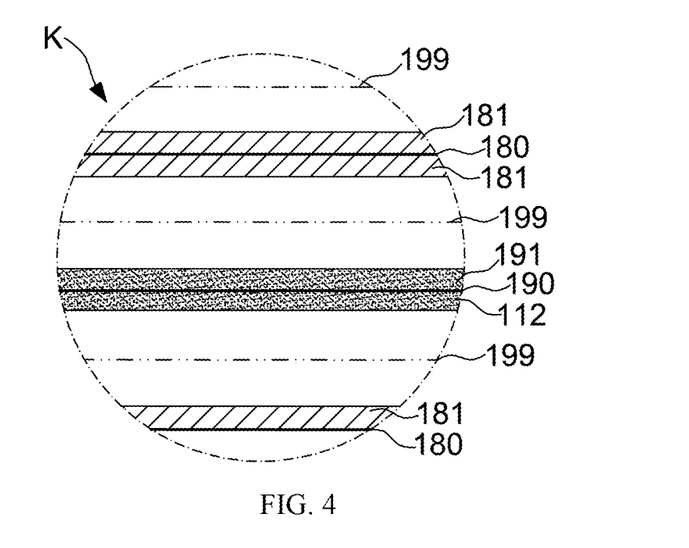
FIG. 4 is an enlarged diagram of a local area in FIG. 3.

FIG. 4 is an enlarged diagram of a local area K in FIG. 3. In some embodiments of this application, the electrode assembly 10 may include a first current collector 180, a second current collector 190, and a separator 199 located between the first current collector and the second current collector. The first current collector 180, the separator 199 and the second current collector 190 are wound together.

In some embodiments, the electrode assembly 10 further includes a first tab 11 and a second tab 12, where one end of the first tab 11 and one end of the second tab 12 extend from an inside of the electrode assembly 10 to an outside of the packaging bag 30, and the other end of the first tab 11 and the other end of the second tab 12 are electrically connected to the first current collector 180 and/or electrically connected to the second current collector 190.

In the embodiment of this application, a part of the first current collector 180 forms the outermost current collector 110. The adhesive layer 101 is pasted between a surface of the outermost current collector 110 facing toward the winding center of the electrode assembly 10 and a part of the separator 199 that is immediately adjacent to the outermost current collector 110. A material of the adhesive layer 101 may include, but is not limited to, a double-sided adhesive.

In some embodiments, a material of the first current collector 180 includes aluminum, and a material of the second current collector 190 includes copper.

In some embodiments, the first current collector 180 is electrically connected to the first tab 11, and the second current collector 190 is electrically connected to the second tab 12.

In some embodiments, the electrode assembly 10 further includes a first active material 181 and a second active material 191. The first active material 181 may be applied on a part of a surface of the first current collector 180 except the outermost current collector 110, and the second active material 191 may be applied on a part of a surface of the second current collector 190.

Figure 5A:
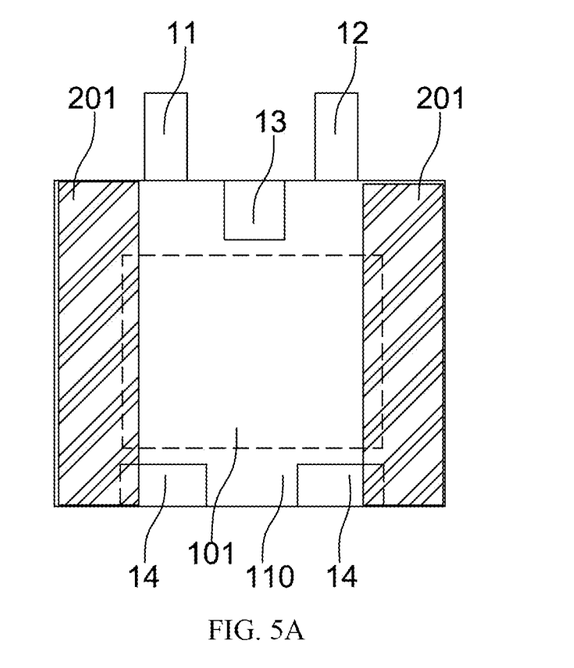
FIG. 5A is a partial top view of the electrochemical apparatus in FIG. 1 with the packaging bag omitted.
Figure 5B:
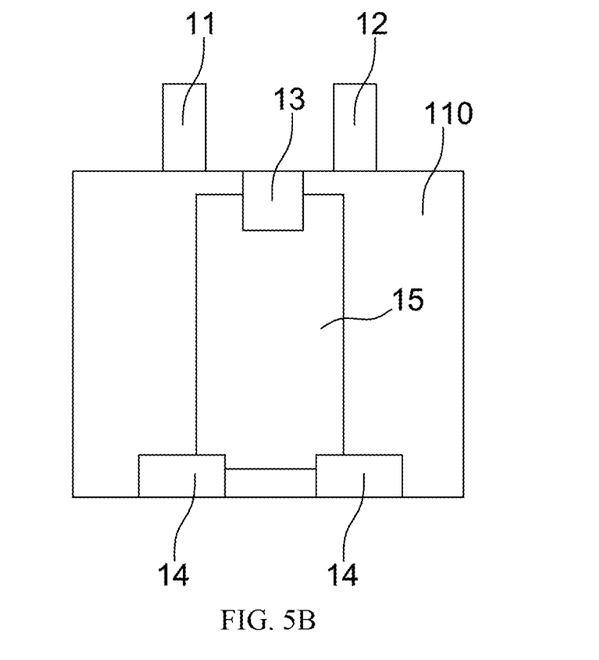
FIG. 5B is a partial bottom view of the electrochemical apparatus in FIG. 1 with the packaging bag omitted.

Referring to FIG. 5A and FIG. 5B, the electrode assembly 10 further includes a first winding adhesive 13 that is located between the first tab 11 and the second tab 12 and that is stretched across the winding structure of the electrode assembly 10, and a second winding adhesive 14 that is located at a side of the electrode assembly 10 away from the first tab 11 and the second tab 12 and that is stretched across the winding structure of the electrode assembly 10. In some embodiments, the second winding adhesive 14 may be provided in a quantity of 2. This is not limited in this application.

In some embodiments, the first connecting layer 201 is pasted to a side of the first bending portion 111 that is close to the flat portion 113, and a tile length of the first connecting layer 201 is less than half a tile length of the first bending portion 111. In this way, the first connecting layer 201 would not cover a sealing zone of the electrode assembly 10, making it convenient for electrode to be injected or poured into the electrode assembly 10.

In some embodiments, the electrochemical apparatus 1 may further include a second connecting layer 202 that is spaced apart from the first connecting layer 201. The second connecting layer 202 is pasted to a part of an outer surface of the second bending portion 112 and to a part of the outer surface of the flat portion 113 adjacent to the second bending portion 112. A projection of the second connecting layer 201 and a projection of the adhesive layer 101 in a direction perpendicular to the outer surface of the flat portion 113 have an overlapping zone.

Although FIG. 3 shows the first connecting layer 201 that is close to the first bending portion 111 and the second connecting layer 202 that is close to the second bending portion 112, a person skilled in the art can understand that, in modifications or other embodiments of this application, the electrochemical apparatus 1 may include only one of the first connecting layer 201 and the second connecting layer 202, or the electrochemical apparatus 1 may include both the first connecting layer 201 and the second connecting layer 202. This is not limited in this application.

For the electrochemical apparatus 1 of this application, the connection between the electrode assembly 10 and the packaging bag 30 is strengthened through provision of the first connecting layer 201. When the electrochemical apparatus 1 drops or has a collision, the electrode assembly 10 and the packaging bag 30 are less likely to move relative to each other, effectively avoiding contraction of the separator 119, and preventing the outermost current collector 110 of the electrode assembly 10 from being torn out. In addition, the first connecting layer 201 and the second connecting layer 202 are correspondingly pasted to mainly the outer surface of the first bending portion 111 and the outer surface of the second bending portion 112. Accordingly, a contact area with the flat portion 113 of the outermost current collector 110 is small, which would not increase thickness of the electrode assembly 10 in the Z direction or increase volume of the electrode assembly 10. As a result, the electrochemical apparatus 1 of this application has relatively good energy density. Further, because the first connecting layer 201 and the second connecting layer 202 are respectively provided between the packaging bag 30 and the first bending portion of the outermost current collector 110 and between the packaging bag 30 and the second bending portion 112 of the outermost current collector 110, overall flatness of the electrode assembly 10 can be improved. This is especially the case for flatness of the part close to the first bending portion 111 and second bending portion 112 in the Z direction. Lithium precipitation causing black spots is thus reduced. Therefore, the electrochemical apparatus 1 of this application has high safety performance in withstanding drops, good energy density and good overall flatness.

It should be noted that the first connecting layer 201 and/or the second connecting layer 202 is applied to the interior surface of the packing bag 30. For the electrode assembly 10, application of glue to an outer surface of the outermost current collector 110 is not needed before the electrode assembly 10 is put into the packaging bag 30.

Figure 6:
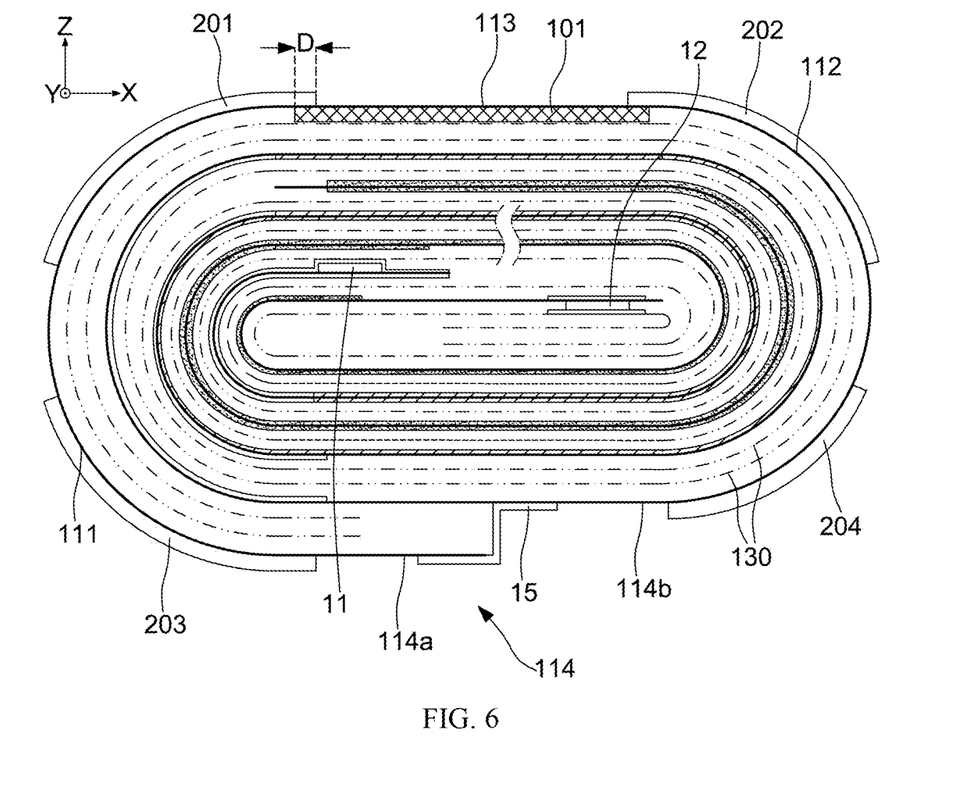
FIG. 6 is a partial sectional diagram of an embodiment of the electrochemical apparatus of this application.

FIG. 6 is a partial sectional diagram of a modified embodiment of the electrochemical apparatus 1. The electrochemical apparatus 1 may further include a third connecting layer 203 and a fourth connecting layer 204 that are spaced apart from each other. The third connecting layer 203 is spaced apart from the first connecting layer 201. The fourth connecting layer 204 is spaced apart from the second connecting layer 202. The third connecting layer 203 is pasted to a part of the outer surface of the first bending portion 111, and the fourth connecting layer 204 is pasted to a part of the outer surface of the second bending portion 112. In this way, the electrochemical apparatus 1 in FIG. 6 includes the first connecting layer 201, the second connecting layer 202, the third connecting, layer 203, and the fourth connecting layer 204. The four connecting layers facilitate relatively good overall flatness of the electrochemical apparatus 1.

In some embodiments, the outermost current collector 110 may further include a step portion 114 that is opposite to the flat portion 113. The step portion 114 includes a first end 114a connected to the first bending portion 111 and a second end portion 114b connected to the second bending portion 112. The second end portion 114b extends in a winding manner to the first end portion 114a. The third connecting layer 203 may further be pasted to a part of an outer surface of the first end portion 114a, and or the fourth connecting layer 204 may further be pasted to a part of an outer surface of the second end portion 114b. In some embodiments, the electrode assembly 10 may further include a tape 15 that is pasted to the outer surface of the first end portion 114a and to the outer surface of the second end portion 114b.

Figure 7:
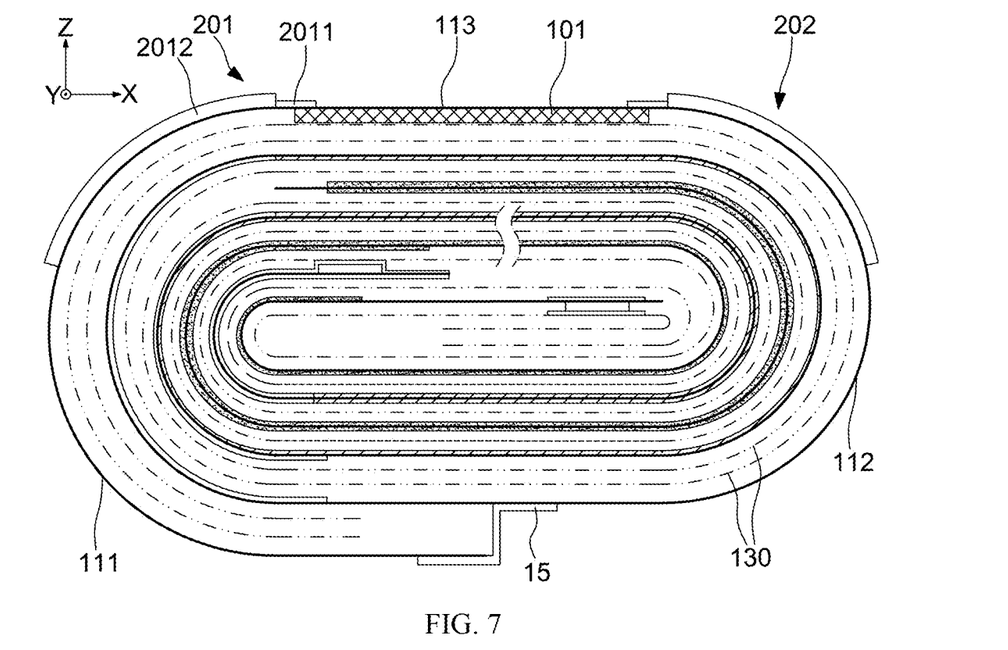
FIG. 7 is a partial sectional diagram of an embodiment of the electrochemical apparatus of this application.

FIG. 7 is a partial sectional diagram of a modified embodiment of the electrochemical apparatus 1. In some embodiments, the first connecting layer 201 may include a first gluing layer 2011 and a second gluing layer 2012 that are connected to each other, where the first gluing layer 2011 is pasted to the flat portion 113, the second gluing layer 2012 is pasted to the first bending portion 111, and a thickness of the first gluing layer 2011 is less than a thickness of the second gluing layer 2012. For example without limitation, the thickness of the second gluing layer 2012 may be 1.5 times the thickness of the first gluing layer 2011. It should be noted that the thickness may be a value measured along the Z direction.

Figure 8:
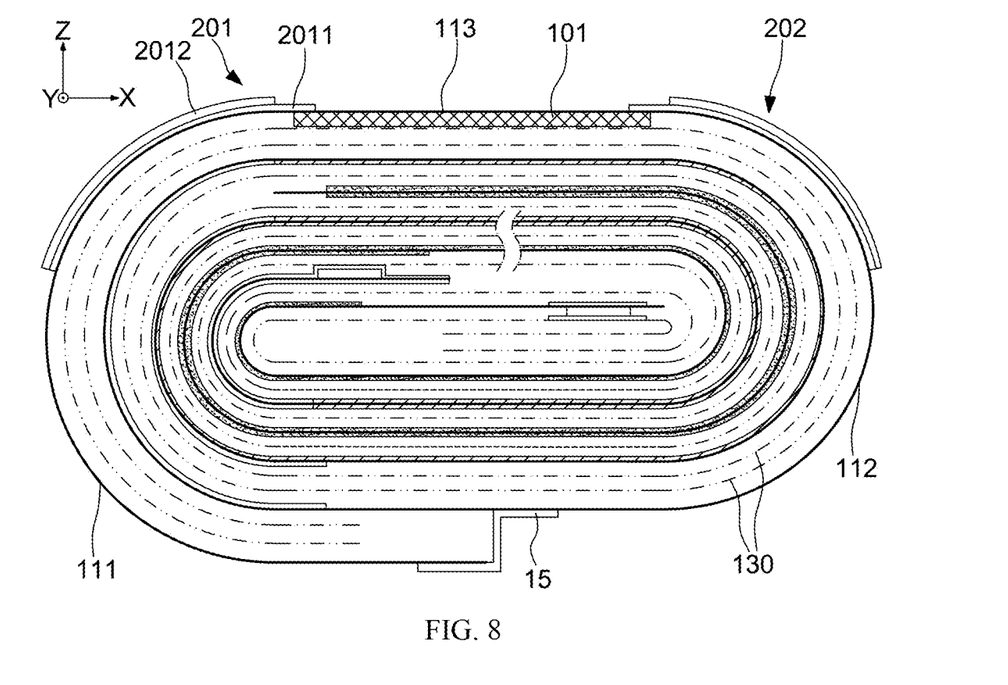
FIG. 8 is a partial sectional diagram of an embodiment of the electrochemical apparatus of this application.

FIG. 8 is a partial sectional diagram of a modified embodiment of the electrochemical apparatus 1. In some embodiments, the first connecting layer 201 includes a first gluing layer 2011 and a second gluing layer 2012, where the first gluing layer 2011 is pasted to the first bending portion 111 and to the flat portion 113, at least a part of the second gluing layer 2012 is provided on the first gluing layer 2011, and a projection of the second gluing layer 2012 and a projection of the adhesive layer 101 in a direction perpendicular to the outer surface of the flat portion 113 do not overlap. For example without limitation, the thickness of the second gluing layer 2012 may be 1.5 times the thickness of the first gluing layer 2011. It should be noted that the thickness may be a value measured along the Z direction.

A person skilled in the art can understand that the second connecting layer 202 may have a similar or same structure just as the first connecting layer 201 does. The structure of the first connecting layer 201 in the foregoing embodiments of this application can all be applied to the second connecting layer 202, or applied to the possibly present third connecting layer 203 and fourth connecting layer. Certainly, the first connecting layer 201, the second connecting layer 2202, the third connecting layer 203, and the fourth connecting layer 204 may have a same structure or similar structures or have different structures. The structures of the first connecting layer 201, the second connecting layer 202, the third connecting layer 203, and the fourth connecting layer 204 in the foregoing embodiments may be used in combination or cross application with each other. Any substitutions, modifications and variations of the first connecting layer 201, the second connecting layer 202, the third connecting layer 203, and the fourth connecting layer 204 without creative efforts shall fall within the protection scope of this application.

Another embodiment of this application further provides au electric device, including the electrochemical apparatus 1 in the foregoing embodiments and modified embodiments. The electric device may include, but is not limited to, consumer electronic devices (mobile communication devices, notebook computers, wearable devices and the like), drones, electric tools, energy storage devices, electric bicycles, electric vehicles, and the like.

Although this application has been shown and described with respect to one or more embodiments, a person skilled in the art can come up with equivalent variations and modifications based on reading and understanding of this specification and the accompanying drawings. This application includes all such modifications and variations subject to only the scope of the appended claims. Specifically, for the functions performed by the foregoing components, unless otherwise indicated, terms used to described these components are intended to correspond to any components that perform the functions specified for such components (for example, they are equivalent in terms of functionality), even if they do not have structures that are equivalent to the disclosed structures for implementing the functions in the exemplary embodiments of this specification described herein. In addition, although specific features of this specification are disclosed with respect to only one of several embodiments, such features can be combined with one or more other features in other embodiments if such combinations are expected to be beneficial to given or specified applications. Further, it should be noted that "a plurality" described herein means two or more. The numeral suffixes in the steps described herein are merely to articulate embodiments for ease of understanding, not to entirely represent a sequential order of the steps being performed, and logical relations should be taken into consideration for determining the sequential order.

The foregoing descriptions are merely the embodiments of this application which are not intended to limit the patent scope of this application. Any equivalent structures or procedural modifications (such as combinations of technical features of different embodiments or direct or indirect applications to other related technical fields) made based on the content of the specification and drawings herein are included in the protection scope of this application.

What is claimed is:

1. An electrochemical apparatus, comprising:
an electrode assembly with a winding structure, wherein the electrode assembly comprises an adhesive layer, an outermost current collector of the electrode assembly comprises a first bending portion and a second bending portion opposite to the first bending portion and a flat portion connecting the first bending portion and the second bending portion, and the adhesive layer is pasted to a part of a surface of the flat portion facing toward a winding center of the electrode assembly;
a packaging bag configured to accommodate at least a part of the electrode assembly; and
a first connecting layer, comprising a first surface opposite to an inner surface of the packaging bag and a second surface opposite to the first surface, wherein the second surface of the first connecting layer is pasted to a part of an outer surface of the first bending portion and to a part of an outer surface of the flat portion, and a projection of the first connecting layer in a direction perpendicular to the outer surface of the flat portion and a projection of the adhesive layer in the direction perpendicular to the outer surface of the flat portion have an overlapping portion;

wherein a length of the first connecting layer is less than half of a length of the first bending portion.

2. The electrochemical apparatus according to claim 1, wherein the first connecting layer comprises a first gluing layer and a second gluing layer connected to the first gluing layer, wherein the first gluing layer is pasted to the flat portion, the second gluing layer is pasted to the first bending portion, and a thickness of the first gluing layer is less than a thickness of the second gluing layer.

3. The electrochemical apparatus according to claim 1, wherein the first connecting layer comprises a first gluing layer and a second gluing layer, wherein the first gluing layer is pasted to the first bending portion and the flat portion, at least a part of the second gluing layer is provided on the first gluing layer, and a projection of the second gluing layer and a projection of the adhesive layer do not overlap in a direction perpendicular to the outer surface of the flat portion.

4. The electrochemical apparatus according to claim 1, further comprising a second connecting layer, wherein the second connecting layer is pasted to a part of an outer surface of the second bending portion and to a part of the outer surface of the flat portion that is adjacent to the second bending portion, and a projection of the second connecting layer in the direction perpendicular to the outer surface of the flat portion and the projection of the adhesive layer in the direction perpendicular to the outer surface of the flat portion overlap.

5. The electrochemical apparatus according to claim 4, wherein the second connecting layer is pasted to a side of the second bending portion adjacent the flat portion, and a length of the second connecting layer is less than half of a length of the second bending portion.

6. The electrochemical apparatus according to claim 4, further comprising a third connecting layer and a fourth connecting layer spaced apart from the third connecting layer, wherein the third connecting layer is spaced apart from the first connecting layer, the fourth connecting layer is spaced apart from the second connecting layer, the third connecting layer is pasted to the part of the outer surface of the first bending portion, and the fourth connecting layer is pasted to the part of the outer surface of the second bending portion.

7. The electrochemical apparatus according to claim 6, wherein the outermost current collector further comprises a step portion opposite to the flat portion, wherein the step portion comprises a first end connected to the first bending portion and a second end connected to the second bending portion, and the second end extends in a winding manner to the first end, wherein the third connecting layer is further pasted to a part of an outer surface of the first end, and/or, the fourth connecting layer is further pasted to a part of an outer surface of the second end.

8. The electrochemical apparatus according to claim 1, wherein a length of the overlapping portion in a first direction is from 0.5 mm to 20 mm, wherein the first direction is in a direction parallel to the outer surface of the flat portion.

9. The electrochemical apparatus according to claim 1, wherein the electrode assembly is formed by winding together a first current collector, a second current collector, and a separator located between the first current collector and the second current collector, wherein a part of the first current collector forms the outermost current collector, and the adhesive layer is pasted between a surface of the outermost current collector of the electrode assembly facing toward the winding center of the electrode assembly and a part of the separator adjacent to the outermost current collector.

10. The electrochemical apparatus according to claim 9, further comprising a first active material and a second active material, wherein the first active material is applied on a part of a surface of the first current collector except the outermost current collector, and the second active material is applied on a part of a surface of the second current collector.

11. An electric device, comprising an electrochemical apparatus, the electrochemical apparatus comprising:
an electrode assembly with a winding structure, wherein the electrode assembly comprises an adhesive layer, an outermost current collector of the electrode assembly comprises a first bending portion and a second bending portion opposite to the first bending portion and a flat portion connecting the first bending portion and the second bending portion, and the adhesive layer is pasted to a part of a surface of the flat portion facing toward a winding center of the electrode assembly;
a packaging bag, configured to accommodate at least a part of the electrode assembly; and
a first connecting layer, comprising a first surface opposite to an inner surface of the packaging bag and a second surface opposite to the first surface, wherein the second surface of the first connecting layer is pasted to a part of an outer surface of the first bending portion and to a part of an outer surface of the flat portion, and a projection of the first connecting layer in a direction perpendicular to the outer surface of the flat portion and a projection of the adhesive layer in the direction perpendicular to the outer surface of the flat portion have an overlapping zone;
wherein a length of the first connecting layer is less than half of a length of the first bending portion.

12. The electric device according to claim 11, wherein the first connecting layer comprises a first gluing layer and a second gluing layer connected to the first gluing layer, wherein the first gluing layer is pasted to the flat portion, the second gluing layer is pasted to the first bending portion, and a thickness of the first gluing layer is less than a thickness of the second gluing layer.

13. The electric device according to claim 11, wherein the first connecting layer comprises a first gluing layer and a second gluing layer, wherein the first gluing layer is pasted to the first bending portion and the flat portion, at least a part of the second gluing layer is provided on the first gluing layer, and a projection of the second gluing layer and a projection of the adhesive layer do not overlap in a direction perpendicular to the outer surface of the flat portion.

14. The electric device according to claim 11, further comprising a second connecting layer, wherein the second connecting layer is pasted to a part of an outer surface of the second bending portion and to a part of the outer surface of the flat portion that is adjacent to the second bending portion, and a projection of the second connecting layer and a projection of the adhesive layer have an overlapping zone in a direction perpendicular to the outer surface of the flat portion.

15. The electric device according to claim 14, wherein the second connecting layer is pasted to a side of the second bending portion adjacent to the flat portion, and a length of the second connecting layer is less than half of a length of the second bending portion.

16. The electric device according to claim 14, further comprising a third connecting layer and a fourth connecting layer spaced apart from the third connecting layer, wherein the third connecting layer is spaced apart from the first connecting layer, the fourth connecting layer is spaced apart from the second connecting layer, the third connecting layer is pasted to a part of the outer surface of the first bending portion, and the fourth connecting layer is pasted to a part of the outer surface of the second bending portion.

17. The electric device according to claim 16, wherein the outermost current collector further comprises a step portion opposite to the flat portion, wherein the step portion comprises a first end connected to the first bending portion and a second end connected to the second bending portion, and the second end extends in a winding manner to the first end, wherein the third connecting layer is further pasted to a part of an outer surface of the first end, and/or, the fourth connecting layer is further pasted to a part of an outer surface of the second end.

18. The electric device according to claim 11, wherein the electrode assembly is formed by winding together a first current collector, a second current collector, and a separator located between the first current collector and the second current collector, wherein a part of the first current collector forms the outermost current collector, and the adhesive layer is pasted between a surface of the outermost current collector of the electrode assembly facing toward the winding center of the electrode assembly and a part of the separator adjacent to the outermost current collector.

\* \* \* \* \*